June 21, 1955  T. N. WILLCOX ET AL  2,710,988
MOLDING MACHINE

Filed Nov. 2, 1950  3 Sheets-Sheet 1

Inventors:
Thomas N. Willcox,
Robert L. Borchert,
George N. Harris,
by *Prowell F. Mack*
Their Attorney.

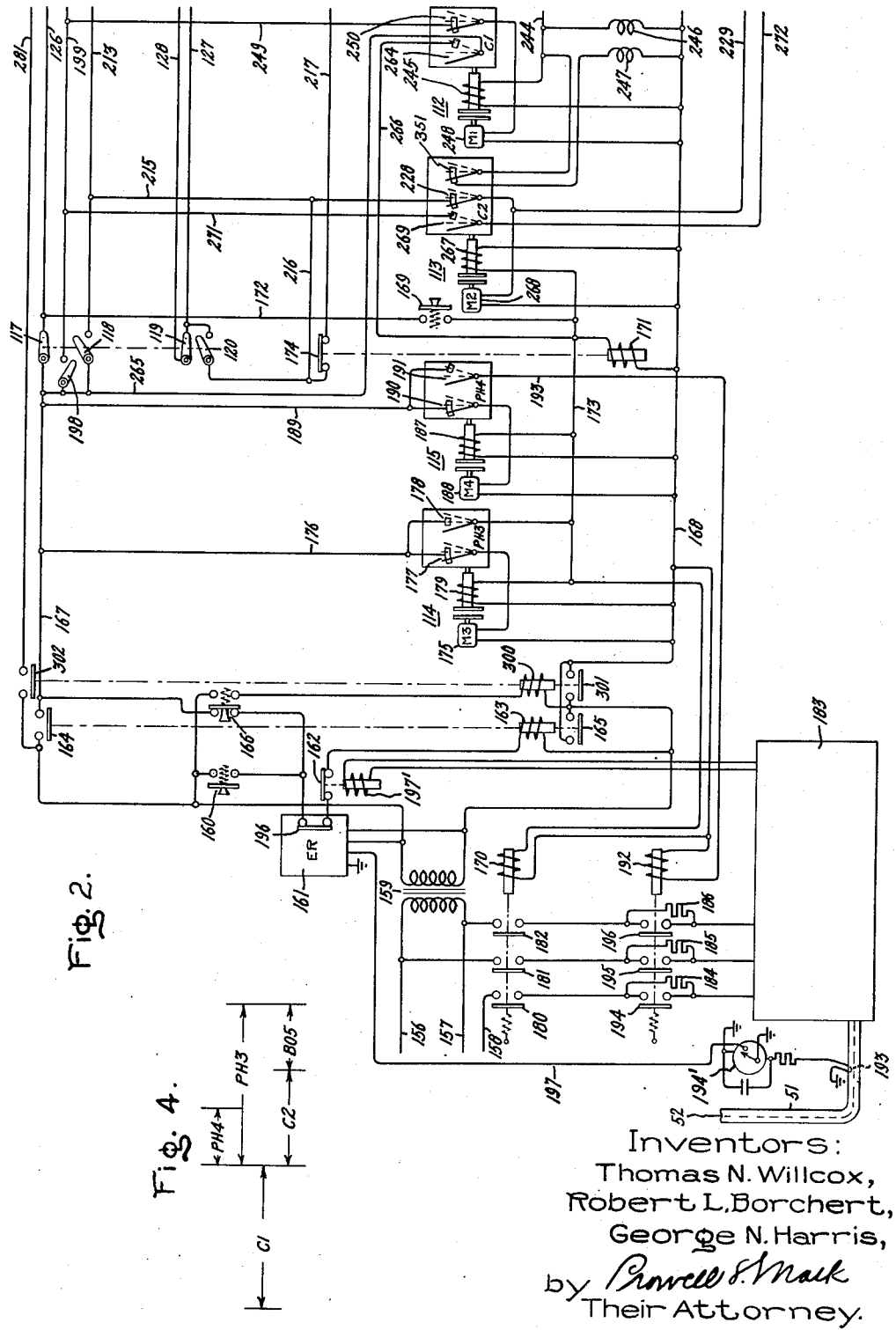

June 21, 1955  T. N. WILLCOX ET AL  2,710,988
MOLDING MACHINE
Filed Nov. 2, 1950  3 Sheets-Sheet 3

Inventors:
Thomas N. Willcox,
Robert L. Borchert,
George N. Harris,
by *Crowell S. Mack*
Their Attorney.

United States Patent Office 2,710,988
Patented June 21, 1955

2,710,988

MOLDING MACHINE

Thomas N. Willcox, Nutley, N. J., Robert L. Borchert, Pittsfield, Mass., and George N. Harris, Schenectady, N. Y., assignors to General Electric Company, a corporation of New York Application November 2, 1950, Serial No. 193,706

5 Claims. (Cl. 18—16)

Our invention relates to machines for molding articles of thermosetting and thermoplastic materials, and more particularly to such molding machines in which a very high or ultra high frequency electromagnetic field is utilized for preheating charges of the material being molded.

The principal object of our invention is the provision of a reliable and efficient machine capable of large production which preheats, molds, cures and discharges from the machine finished articles of a thermosetting or thermoplastic material.

A further object of our invention is to provide an improved charging mechanism for a transfer type molding machine.

A still further object of the invention is to provide an improved operating mechanism for an hydraulically operated press.

Additional objects and advantages of our invention will be apparent from the following description of a preferred embodiment thereof, while the scope of the invention is defined in the appended claims.

In carrying out our invention in one form, we provide an automatic molding machine having a vertically disposed clamping ram carrying the movable portion of a portable multicavity transfer mold, a second fixed portion of the portable mold below the movable portion, and a transfer ram operating through an opening in the fixed portion of the mold. The transfer ram acts cooperatively with the clamping ram to provide the pressure necessary for molding. A resonant cavity preheating chamber energized by an ultra high frequency electromagnetic field is located adjacent the transfer ram, and a combined transfer and loading mechanism is provided which picks up preformed pellets of the material to be molded and transfers them to the preheating chamber and then after they have been heated loads them onto the transfer ram. Air blast means are provided for removing the molded parts from the machine after molding, and an electrical control system including timers, relays, limit switches, and other devices, is provided for the automatic operation of the machine.

Figure 1:
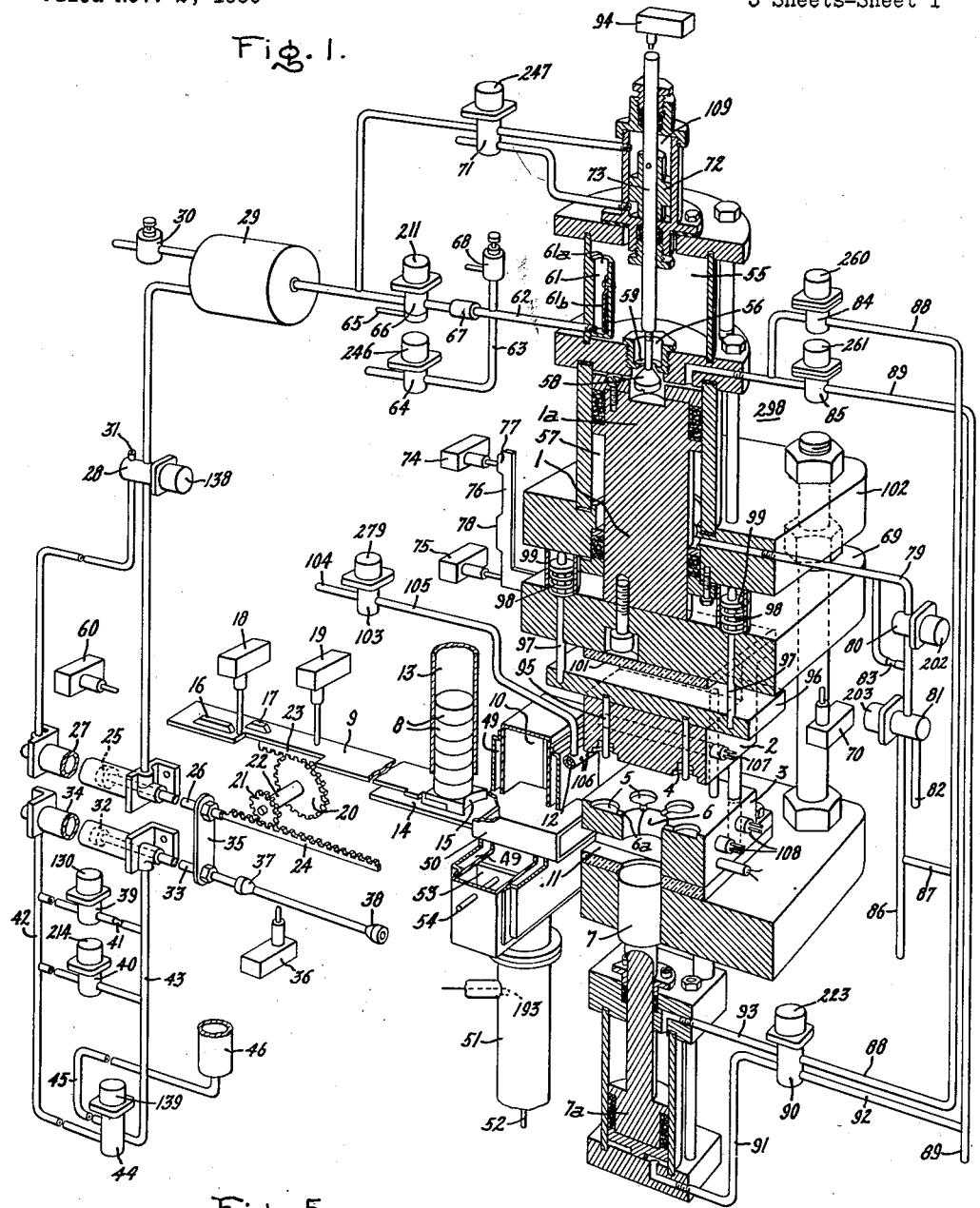
Figure 5:
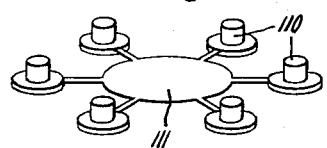
Figure 3:
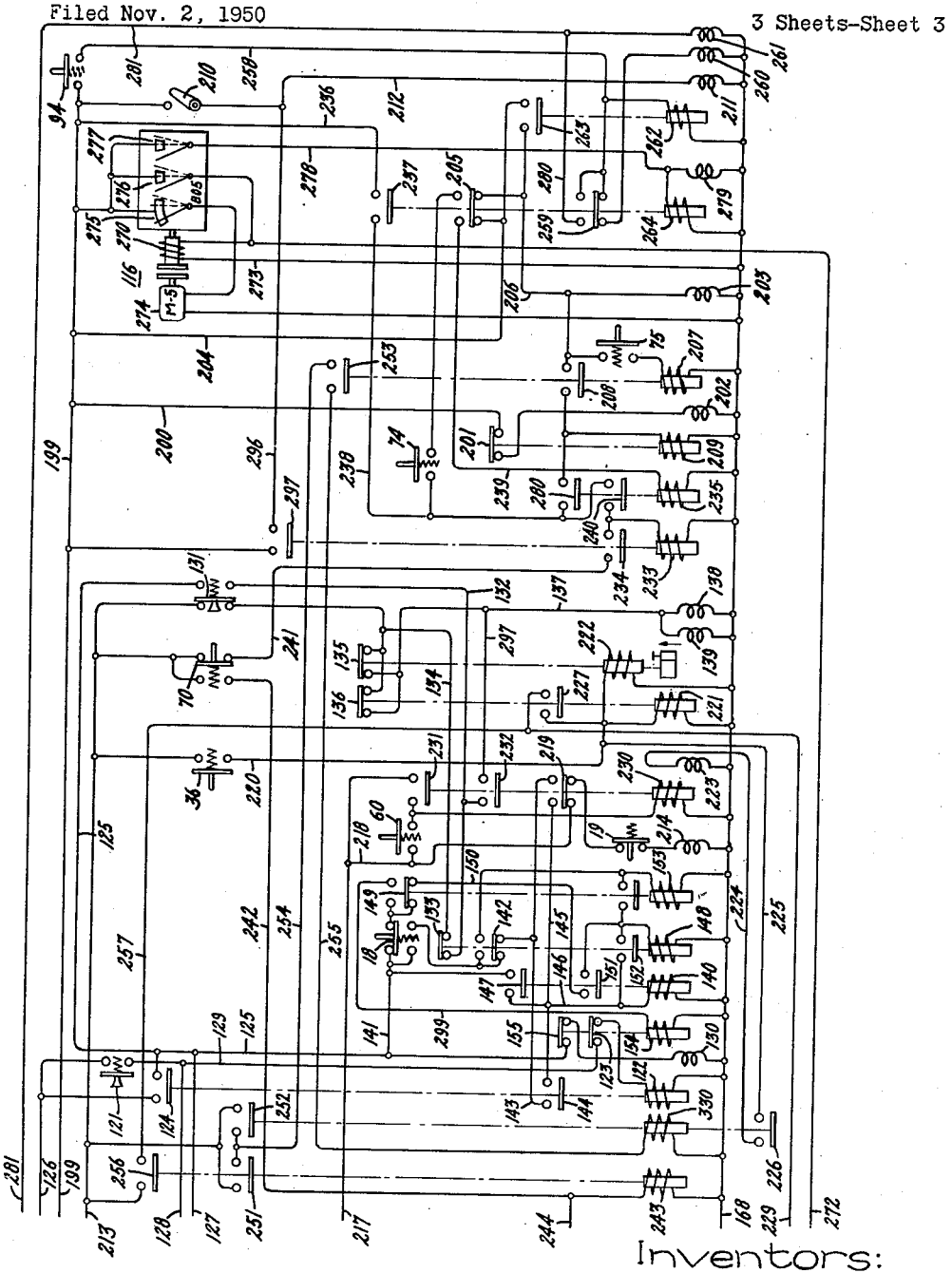

For a clearer and more complete understanding of our invention, reference should be had to the accompanying drawing, Fig. 1 of which is a schematic diagram in perspective and partially in section of a preferred embodiment thereof, Figs. 2 and 3 depict schematically the electrical circuit diagram of this embodiment of the invention, Fig. 4 shows diagrammatically the cycles of electrical timers forming a part of the automatic electrical control system, and Fig. 5 illustrates typical molded parts and flash which are produced by this machine.

Referring to Fig. 1 of the drawing, there is shown an automatic molding machine constructed in accordance with our invention which includes a clamping ram 1 to which is secured a movable upper mold section 2. The clamping ram is operated by a combination of compressed air and water under high pressure, and the operating mechanism is explained in detail subsequently. The upper mold section 2 cooperates with a fixed lower mold section 3, each of the mold sections having a plurality of mating depressions forming mold cavities. These depressions are indicated by the numerals 4 in the upper mold section and by the numerals 5 in the lower mold section. The lower mold section 3 has a large central opening 6 through which a transfer ram 7 operates. Both mold sections are heated. Together, rams 1 and 7, molds 2, 3 and their appurtenances comprise a transfer press which is designated generally by the numeral 298 on the drawing.

Preformed pellets 8 of the material to be molded are taken one at a time from a stack of such pellets and are moved by a pusher 9 into a resonant cavity preheating chamber 10, following which the pusher 9 is withdrawn to a neutral position with the forward end between the pellet stack and the preheater chamber 10. After a predetermined length of time in the preheating chamber, the heated pellet is picked up again by pusher 9 and moved from this chamber through a side opening 11 below the upper surface of lower mold section 3 onto the upper surface of ram 7. After clamping ram 1 has descended to close the mold, by bringing mold sections 2 and 3 together, ram 7 operates to transfer the material to be molded into the plurality of mold cavities 4, 5 through the illustrated radially disposed connections 6a with the central opening 6 in the lower mold section. When the mold subsequently is opened by retraction of the clamping and transfer rams, after a curing interval, the molded parts, together with the surplus material or flash connecting them together like the hub and spokes of a wheel, are removed from the machine. The molded parts are separated from the two mold sections in a manner which is described in detail subsequently, after which the molded parts and flash are blown out of the machine by means of an air blast from a header 12.

While one molding and curing operation is taking place, another pellet is being preheated in the resonant cavity heating chamber and thereafter the machine operates automatically under the control of the electrical control system illustrated in Figs. 2 and 3 of the drawing.

There follows next a more detailed explanation of the operation of the applicants' automatic molding machine, and following that is a detailed explanation of the electrical control system.

In the operation of the machine, preformed charges or pellets 8 of the material to be molded are placed in a vertical stack in a tube 13. This may be done manually or automatically. Automatic loaders are available which take such pellets in the bulk from a hopper and stack them in a tube such as tube 13. When pusher 9 moves to the left in Fig. 1 to the maximum extent of its travel, the lowermost one of the pellets 8 drops down on to a base member 14 and is subsequently engaged by the concave forward end 15 of the pusher. The pusher 9 is equipped with a pair of projections 16 and 17 forming cam surfaces which operate respectively limit switches 18 and 19. Pusher 9 also operates a limit switch 60 at the extereme left end of its travel.

The pusher 9 is operated by a rack and pinion mechanism which in the embodiment illustrated includes a direction reversing and movement multiplying arrangement which has the effect of shortening the overall length of the molding machine. These things are accomplished by the combination of a large gear 20 and a small gear 21 rigidly mounted on a common shaft 22 with the larger gear meshing with a rack 23 on the lower side of pusher 9 and the smaller gear 21 meshing with a second rack 24. It will be readily understood that gears 20 and 21 and racks 23 and 24 can be omitted if desired and the pusher operated directly by its operating mechanism.

The operating mechanism illustrated for pusher 9 includes a pneumatically actuated piston 25 having a connecting rod 26 which is rigidly joined to rack 24. Piston 25 operates in a cylinder 27 and is supplied with compressed air selectively on either operating surface of the piston by a solenoid operated valve 28 which may receive air from a reservoir 29 which in turn may be supplied through an inlet valve 30. In a typical apparatus reservoir 29 contained air at a pressure of 70 lbs. per sq. inch gauge. Solenoid operated valve 28 is arranged to supply air continuously to cylinder 27. In its deenergized position, valve 28 supplies air to the blind end of the cylinder 27 so that piston 25 is held against the opposite or rod end of the cylinder. This corresponds to the completely withdrawn left-hand position of pusher 9. A vent 31 is provided for releasing the air pressure from the side of piston 25 opposite the side to which air pressure is being applied.

For controlling the speed and extent of movement of piston 25, there is provided a hydraulic mechanism which includes a piston 32 joined to a connecting rod 33 and arranged for movement in a cylinder 34. Connecting rod 33 is rigidly joined to connecting rod 26 by a linkage 35 so that piston 32 moves simultaneously with piston 25. Connecting rod 33 at each end of its travel operates a limit switch 36 by means of a pair of projections 37 and 38 on rod 33.

Cylinder 34 is filled with oil or other suitable hydraulic fluid and the two ends of the cylinder are connected together through a pair of solenoid operated valves 39 and 40. Valve 39 has an orifice 41 in series therewith so that only a limited flow of oil is permitted through this valve, while valve 40 does not have such an orifice and, therefore, permits a relatively large flow of hydraulic fluid between the two ends of the cylinder 34. Valves 39 and 40 are connected between a pair of conduits 42 and 43 which are joined respectively to the opposite ends of cylinder 34. Conduits 42 and 43 are also connected to a three-way valve 44. Valve 44 is connected to a conduit 45 which in turn is joined to a reservoir 46.

When valve 40 is open, piston 32 is free to move with relative ease from one end of the cylinder 34 to the other whereby piston 25 is permitted to operate pusher 9 rapidly in either direction. When piston 32 is thus operated, the oil flows from one side of the piston to the other through valve 40. During a movement from left to right, any additional oil which may be required on the blind end of cylinder 34 to compensate for the volume of piston rod 33 is taken from reservoir 46 through conduit 45, valve 44 and conduit 42. In a similar manner, the excess of oil due to the displacement of piston rod 33 when the piston 32 is moving in the other direction is admitted to the reservoir from conduit 42 through valve 44 and conduit 45.

When valve 39 is open, piston 32 may be similarly operated from one extreme of its travel to the other but such movement is at a slower speed than when valve 40 is open because of the orifice 41 which restricts the flow of oil between the ends of the cylinder 34. The deficiency or excess of hydraulic fluid is again compensated for in this case by the reservoir 46 and the connecting conduits and valves.

When valves 39 and 40 are closed and valve 44 is in a position to prevent admission of oil to the reservoir, piston 32 is held stationary by the oil in the rod end of cylinder 34. This in turn holds piston 25 and pusher 9 from returning to the extreme left position.

When pusher 9 picks up a pellet 8, it moves the pellet into preheating chamber 10. Preheater 10 is of the resonant cavity type having walls of electrically conductive material. Chamber 10 may be equipped with quarter wave sleeves 49 adjoining the entrance and exit openings to the chamber to minimize the escape of electrical energy from the chamber.

In the preheater illustrated, the chamber is also equipped with a guide member 50 of low loss dielectric material extending through the heating chamber for supporting the pellet being heated while it is in the preheater and providing a support for the pellet while it is being moved into and out of the preheater. High frequency energy, which may, for example, be at a frequency of approximately 915 megacycles per second, is coupled into the resonant cavity preheater 10 by a suitable loop or probe (not shown) whereby standing electromagnetic waves are set up in the heating chamber. This energy may be conducted to the heating chamber by at concentric conductor transmission line comprising an outer conductor 51 and an inner conductor 52, this transmission line being connected to the generator or other source of high frequency electrical energy. A tuning device may be provided for the resonant cavity heating chamber, such as adjustable plate 53 of electrical conductive material having a rod 54 for adjusting the position of plate 53 within the heating chamber to adjust the electromagnetic field distribution therein for varying heating conditions.

After a pellet 8 has been heated in chamber 10, pusher 9, which was withdrawn to the illustrated neutral position during the heating operation, moves forward again slowly until it contacts the heated pellet and then moves rapidly to push the pellet into the mold through opening 11 on to the top of ram 7. Before transfer ram 7 operates, however, the clamping ram must have operated and then returned to the mold closed position; therefore, the operation of the latter is explained first.

The clamping ram, as mentioned previously, is operated jointly by compressed air and water pressure in order to obtain rapid operation and to provide protection for the mold in case of faulty part removal. This mode of operation also has the effect of conserving water because only a small amount of makeup water must be provided for each stroke of the ram. The major portion of the water remains in the mechanism after the completion of the stroke and is used again for the next stroke. Briefly, this is accomplished by utilizing air pressure in an upper chamber 55 to force water through a relatively large port 56 into a lower chamber 57 and thereby move operating piston 1a and the remainder of the clamping ram downward to substantially the closed position. Then a valve member 58 is moved upwardly against a corresponding valve seat 59 to close port 56 after which water pressure is applied to chamber 57 to apply a large pressure on the mold.

In describing in detail the operation of the clamping ram, it is assumed that the piston 1a is in the raised position illustrated in Fig. 1 of the drawing and that upper chamber 55 is filled with water up to a level between the upper margin 61a of a baffle chamber 61 and the bottom of chamber 55, this water having been pushed up through port 56 by the previous upward stroke of piston 1a. Baffle chamber 61 is arranged as shown to prevent incoming air from a conduit 62 from mixing with the water during the down stroke in order to prevent foaming in lower chamber 57. The baffle which forms chamber 61 is provided near its lower termination with a check valve 61b which provides for the draining off from the prefill chamber 55 of any water in excess of that required for a given stroke so that the same amount of water is available for each stroke. Check valve 61b is closed when air is flowing into chamber 55 from conduit 62 but opens when the direction of pressure is reversed. Any excess water in chamber 55 flows through check valve 61b into chamber 61, through conduit 62 and a connecting second conduit 63, and is removed from the machine through a solenoid operated valve 64 the operation of which is described later in connection with the description of the electrical control system.

Compressed air is admitted to prefill chamber 55 through a solenoid valve 66 and a check valve 67 and thence through conduit 62. Check valve 67 prevents the flow of air and water in the reverse direction from the prefill chamber back to the air reservoir 29. Valve 66 may be a three-way valve in order to ensure that in its deenergized position any water leakage from check valve 67 is directed to drain through drain conduit 65 rather than to the air supply reservoir. A relief valve 68 may be provided to prevent an excessive pressure occurring in chamber 55, and in a typical machine incorporating our invention this relief valve was set at 100 lbs./sq. in. gauge. To initiate the operation of piston 1a to close the clamping ram, valve 66 is opened by suitable action of the electrical control system and compressed air is admitted from reservoir 29 into chamber 55 by way of baffle chamber 61, forcing the water from chamber 55 through port 56 and pushing ram 1 downward until a platen member 69 connected to and forming a part of the clamping ram contacts and actuates a limit switch 70. This deenergixes valve 66, thus stopping the flow of compressed air to prefill chamber 55, and simultaneously energizes another solenoid operated valve 71. The latter admits compressed air from the reservoir 29 to the underside of a piston 72 which moves upwardly in its cylinder 109 and by means of interconnecting piston rod 73 closes the valve member 58. This seals lower chamber 57 from upper chamber 55, and the lower chamber is then ready for the application of water pressure.

When port 56 and valve 66 are closed, air at approximately reservoir pressure is trapped in chamber 55. Then when drain valve 64 is subsequently opened and releases this pressure, check valve 61b opens and any excess water remaining in chamber 55 is forced out of the drain.

In the event that all of the molded parts or flash from the previous operation were not blown clear of the mold, switch 70 would not be closed at the end of the downward stroke because of the presence of this material in the mold, and the clamping ram would stall. This is because the air pressure does not develop sufficient force on the ram to completely close it in such a case, thereby preventing damage to the mold which might result if water pressure were applied under these conditions.

During the downward motion of piston 1a, the lower end of the chamber 57 in which it operates is opened to the atmosphere to permit water which is present in the lower portion of the chamber from the previous operation to be expelled. This occurs through a conduit 79 which is connected through a solenoid operated valve 80 and a second three-way solenoid operated valve 81 to the atmosphere through a drain conduit 82. When valve 80 is open and valve 81 is open to the atmosphere, there is practically unrestricted flow of water from beneath piston 1a and rapid motion of ram 1 is permitted. As the ram moves downwardly, a cam portion 78 on a projection 76 thereon engages a limit switch 75 and closes valve 80. This makes it necessary for the water being exhausted from chamber 57 to go through a bypass around valve 80 which contains an orifice 83, thus reducing the speed of the ram by restricting the flow of water and providing a cushioning effect as it approaches the bottom of its travel.

After the clamping ram has moved downward sufficiently to energize switch 70 and operate piston 72 to close port 56, a large pressure is applied to piston 1 by admitting to chamber 57 water under a very high pressure such as, for example, 2000 lbs./sq. in. This is done by energizing a solenoid operated valve 84 which admits water to chamber 57 from a supply conduit 86 through interconnecting conduits 87 and 88, and, thence through valve 84 and suitable interconnecting conduits into cylinder 57. When the molding operation is complete and it another valve 85 is opened long enough to release the pressure on the top of piston 1a to atmosphere through a conduit 89. When this pressure has been released, valve 71 is deenergized to move piston 72 and valve member 58 to the positions shown in Fig. 1. With the reversal of valve 81, ram 1 is raised, with the water on top of piston 1a being forced through port 56 into prefill chamber 55.

During operation, after the clamping ram has descended and upper mold section 2 is in contact with lower mold section 3, transfer ram 7 is operated to transfer the heated pellet through opening 6 into the plurality of mold cavities formed by depressions 4 and 5 in the two mold sections. Piston portion 7a of the transfer ram is operated by the actuation of a solenoid valve 90 which admits water under pressure from the supply conduit 86 through conduits 87 and 88, valve 90 and interconnecting conduit 91 to the underside of piston 7a. When the molding operation is complete and it is desired to retract ram 7 again, valve 90 is operated to remove the pressure from conduit 91 and open this conduit to drain through a conduit 92 which interconnects with drain conduit 89. At the same time, water under pressure is admitted to the top side of the piston portion 7a of ram 7 through a conduit 93 to cause the ram to return to its lower position.

After the parts have been subjected to heat and pressure in the mold cavities for a sufficient length of time and thereby cured, the mold is broken so that the molded parts may be removed. The cure time may be only a few seconds providing the pellet 8 is raised to approximately molding temperature in the resonant cavity preheater before it is moved to the transfer ram and is transferred by this ram to the molding cavities. During the time interval required for this cure and the removal of finished parts from the machine, pusher 9 is retracted to pick up another preform 8, moved forward to position the preform in the center of the preheating chamber, and withdrawn to the neutral position shown in Fig. 1. Preheating and moving this additional preform into chamber 6 are also completed during this interval to minimize the time delay between completion of one cycle and transferring additional material to the cavities for the next molding and curing operation.

In order to remove the molded parts from the mold cavities, each of the depressions 4 in the upper mold section is provided with a pin 95. These pins are embedded in a plate member 96, forming a movable portion of the mold, and plate 96 in turn is supported by a plurality of spring loaded pin members 97 movably positioned in openings in the platen member 69. The latter pin members and their loading springs 98 are arranged so that when the ram descends the springs 98 expand within their guides 99 and raise plate 96 and pins 95 upwardly with respect to platen member 69 which forms a part of the ram. A base plate 101 of the platen engages the upper surface of the pin bar 96 during the downward stroke. Then when the clamping ram assembly subsequently moves upwardly again, pins 97 come in contact with a large stationary plate member 102. This again compreesses the springs 98 and forces plate 96 and pins 95 downwardly. The latter move to the projection positions illustrated in the drawing, thus forcing the molded parts out of the upper depressions 4.

In order to remove the flash which remains on the top of ram 7 and in the interconnecting passages 6a between chamber 6 and mold cavities 4, 5, the machine is arranged so that transfer ram 7 follows clamping ram 1 upwardly for a short distance after the mold parts. This disengages the slug from chamber 6 in the stationary lower mold section 3.

When the molded parts and the flash thus have been disengaged from the mold sections, a blast of air is utilized to remove the molded parts and the flash from the machine. The blast of air results from the actuation of a solenoid operated valve 103 which admits air from a supply line 104 through a conduit 105 to the header 12 from which it passes through a plurality of ports 106 between the faces of the two mold sections. It will be understood, of course, that a suitable container (not shown) may be provided for the machine for receiving the molded parts and flash as they are blown out from between the faces of the mold sections.

The mold sections 2 and 3 may be heated by any suitable means such as by an electrical heating unit 107 in the upper mold section 2 and a plurality of electrical heating units 108 in the lower mold section 3, to provide for the curing of the molded parts in the mold.

The mold illustrated in the drawing has six mold cavities 4, 5 but it will be understood that any desired number of cavities may be provided depending upon the number of parts which it is desired to mold simultaneously and upon the size of each. Six typical molded parts designated individually by the numeral 110 are illustrated in Fig. 5 on the drawing together with the flash 111. The arrangement shown in Fig. 5 is a typical one which corresponds to the arrangement and shape of the mold cavities illustrated in Fig. 1 of the drawing.

The operation of the electrical control system for the applicants' molding machine is based upon five electrical timers. These timers, which may be referred to as cure 1, cure 2, preheat 3, and blowout 5, cooperate with each other. In Fig. 4 of the drawing there is shown a chart which illustrates the operation and cooperation of the various timers. In this chart it will be noted that during the time that the cure 1 timer (denoted by C1 in Fig. 4) is operating, none of the other timers is operating. As soon as the timer cure 1 times out, three additional timers begin to operate, preheat 3 designated by PH3 in the chart, preheat 4 designated by PH4 in the chart, and cure 2 designated by C2. The timer preheat 4 times out relatively quickly. When the cure 2 timer times out, it energizes the last remaining timer blowout 5 and this timer completes its cycle just before the end of the timing interval of timer preheat 3.

During the period when timers C1 and C2 are operating, the molded parts are curing in the mold and when the blowout timer is operating the air blast is blown between the two mold sections to remove the molded parts and the flash from the machine. The preheater is operating during the period that timers preheat 3 and preheat 4 are in operation and, as mentioned above, the blowout timer ceases operation just before the end of the cycle of preheat timer 3 so that another part is preheated and ready for molding immediately that a preceding part has been ejected from the machine. Two preheat timers are used in the machine illustrated and described herein in order to apply reduced heating energy during a short interval at the beginning of the preheat period. However, it will be understood that a single timer may be substituted for these two preheat timers if desired. In the typical machine being described, the ultra high frequency generator which was used to supply energy to the preheater required a brief interval of operation at reduced voltage for best performance.

In Figs. 2 and 3 the timers corresponding to C1, C2, PH3, PH4, and BO5 in Fig. 4 are designated respectively by the numerals 112, 113, 114, 115 and 116.

In the machine illustrated in Fig. 1, some operations may be performed manually if desired. These operations are described first in explaining in detail the operation of the electrical control system which is shown in Figs. 2 and 3 of the drawing. The following operations may be performed manually:

I. The pusher 9 may be withdrawn from the neutral position between the preheater 10 and the stack of pellets 8 to a position behind the stack in order to pick up a pellet.

II. After operation I the pusher may be moved forward from a position behind the stack of pellets to move a pellet to approximately the center of the resonant cavity preheater 10, and then withdrawn to the neutral position.

III. The preheater may be turned on for the period governed by preheater timers 3 and 4 (114 and 115 in Fig. 2) to preheat the pellet positioned in the chamber by operation II.

IV. The press can be closed to facilitate adjustment of the press and heating of the mold.

The electrical control system is supplied with power at consumers' voltage and frequency. This may, for example, be three-phase power at 220 volts, 60 cycles and it may be connected to the control system through three conductors 156, 157 and 158. In the apparatus illustrated in Fig. 2 the ultra high frequency generator is supplied with three-phase power while the remainder of the control system receives single-phase power through an isolating transformer 159. One of the secondary terminals of this transformer is connected to a starting push button switch 160, thence through the contacts 196 of a relay 161, a normally closed switch 162 and through the coil of a solenoid 163 back to the other secondary terminal of the transformer. When switch 160 is closed, solenoid 163 is energized, closing switches 164 and 165. The closing of switch 164 holds solenoid 163 in through a circuit including a stop push button switch 166 as long as the latter remains in its unactuated position. When switch 166 is actuated, solenoid 163 is deenergized and the control circuits are deenergized again through the opening of switch 164 and 165. As long as switches 164 and 165 remain closed, the control circuits are energized through a pair of main conductors which bear the numerals 167 and 168.

In order to prepare the control system for manual operation, four switches designated by the numerals 117, 118, 119 and 120 and having a common operating mechanism are moved to the positions illustrated in Fig. 2. In this position of the oeperating mechanism switches 117 and 119 are closed and switches 118 and 120 are open.

In understanding the description of the electrical control system it should be understood that Figs. 2 and 3 of the drawing comprises a single schematic electrical circuit diagram. That is, the conductors at the right-hand side of Fig. 2 are joined to the corresponding conductors at the left-hand side of Fig. 3.

With switch 117 closed, energizing a conductor 126, the closing of a manually actuated push button switch 121 energizes a solenoid 122 through a conductor 129 and the normally closed contacts of a solenoid operated switch 123. The energization of solenoid 122 closes a normally open switch 124 which energizes a conductor 125 from conductor 126. The energizing of conductor 125 produces two results. First, it enables solenoid 122 to hold itself in through a circuit including conductors 127 and 128 and the switch 119 which is now closed.

The energizing of conductor 125 also energizes, through a switch 155, a solenoid 130 which is connected to and operates hydraulic valve 39 forming a part of the hydraulic check system for the pellet loader. Energizing solenoid 130 opens valve 39 and allows oil to pass from one end of cylinder 34 to the other through orifice 41. Since valve 28 in its quiescent position provides for air pressure on the blind end of cylinder 27, as soon as oil valve 39 is energized, the hydraulic check system allows the piston 25 to move to the rod end of cylinder 27. This motion is transmitted through gears 21 and 22 and their corresponding racks to the loader 9. Since the motion is reversed by the rack and pinion combination, the loader withdraws to its extreme left position behind the stack of preforms.

During such operation, as explained previously, oil flows from the reservoir 46 through conduit 45, valve 44 and conduit 42 to the blind end of cylinder 34 to provide oil to make up the volume difference due to the displacement of rod 33. Thus manual operation I is completed.

After the completion of manual operation I, operation II listed above may be performed by depressing a push button switch 131 and closing its normally open contacts.

Inasmuch as switch 124 is still closed so that conductor 125 remains energized, this operation energizes a conductor 132 which is connected through a normally closed switch 133 and a conductor 134 to a pair of switches 135 and 136. Through these two switches in parallel and a conductor 137, a circuit is completed through the coils of two solenoids 138 and 139 to the other main supply conductor 168, thus energizing solenoids 138 and 139. Solenoid 138 operates air valve 28 and solenoid 139 operates three-way hydraulic valve 44.

Energizing solenoid 138 moves air valve 28 to admit air to the rod end of the cylinder 27 and starts the piston 25 moving into the cylinder and the loader 9 moving toward the preheater inasmuch as valve 39 is still open to allow oil to pass from one end of the hydraulic check cylinder 34 to the other. Energizing solenoid 139 moves three-way hydraulic valve 44 to permit the excess oil in the blind end of cylinder 34 to flow through valve 39 and orifice 41 into the reservoir 46, the path from the orifice to the reservoir being through conduit 43, valve 44 and conduit 45, and thence into the reservoir. When pusher 9 has moved a predetermined distance forward, carrying the preform, projection 16 on the pusher engages the operating rod of limit switch 18 and actuates this switch, opening the normally closed contacts and closing the normally open contacts thereof (see Fig. 3 for the contact arrangement of this switch). Closing the latter contacts energizes a solenoid 140 through a circuit which includes conductor 125, a conductor 141, the normally open contacts of switch 18, the normally closed contacts of a switch 142, a conductor 143, a normally open switch 144 which is now closed since solenoid 122 is energized, a conductor 145, a conductor 146 and thence through the coil of solenoid 140 to the alternating current supply line 168. When solenoid 140 is energized it closes a switch 147 to hold itself in, this switch being connected directly from conductor 141 to the junction of conductors 145 and 146. As pusher 9 is moved, limit switch 18 passes beyond the cam projection 16 and again reverts to its original position. This closes the normally closed contacts of switch 18 and energizes another solenoid 148 through a circuit which may be traced from normally closed contacts of switch 18 through the normally closed contacts of a switch 149, a conductor 150, a switch 151 which is normally open but which is now closed due to the fact that solenoid 140 is energized, thence through the coil of solenoid 148 to supply conductor 168. When solenoid 148 is energized it closes a switch 152 and thereby holds itself in since it then receives current from conductor 146. The energizing of solenoid 148 also opens switch 133 which opens the circuit to and deenergizes solenoids 138 and 139. Deenergizing solenoid 138 moves valve 28 to reverse the air flow to cylinder 27 and thereby reverse the direction of movement of pusher 9.

As the pusher moves backward (to the left in Fig. 1), switch 18 is again operated, reversing the normal position shown in Fig. 3 and closing the normally open contacts of this switch. This energizes a solenoid 153 through switch 142 which is now closed as a result of the action of solenoid 148. The energizing of solenoid 153 reverses the normal position of switch 149 which is operated thereby, opening the normally closed contacts of this switch and closing the normally open contacts thereof. When the pusher has withdrawn to its neutral position between the stack of pellets and the preheating chamber, switch 18 is again actuated by the operating rod dropping off of the cam projection 16 on the pusher. This stops the reverse motion of the pusher because when the switch 18 returns to its normal position and closes its normally closed contacts, a solenoid 154 is energized through switch 149 and a conductor 299. Energizing solenoid 154 opens switches 123 and 155. The opening of the latter deenergizes solenoid 130 and closes valve 39 which traps oil in the rod end of the hydraulic check cylinder 34 and stops the motion of the pusher in the neutral position. The opening of switch 123 deenergizes solenoid 122, opening switches 124 and 144, which deenergizes solenoids 154, 140, 148 and 153 and restores this portion of the system to the status existing before push button switch 121 was actuated to initiate manual operation I.

When operations I and II have been completed, the pellet has been placed in approximately the center of the resonant cavity heating chamber and the pusher withdrawn to the neutral position just outside the heating chamber. Operation III of heating the pellet may be performed by the following operation.

To heat a preformed pellet manually, a normally open push button switch 169 is depressed. This energizes the clutches of timers 114 (PH3) and 115 (PH4) along with a pair of solenoids 170 and 171, the circuit through which these devices are energized including a conductor 172 which joins main conductor 167 and switch 117 to switch 169 and an intermediate conductor 173 to which one terminal of each of these devices is joined, the other terminal of each being joined to the other main supply conductor 168. The solenoid 171 opens a switch 174 to prevent motion of the pusher 9 while the preheater is operating, in a manner which is explained in detail later.

With regard to timer 114 the motor 175 thereof is already running inasmuch as it is connected between conductors 167 and 168 through conductor 176 and through the left-hand switch contacts of the timer which are designated by the numeral 177. Switch 177 and the right-hand switch 178 of this timer have three positions each, as illustrated in Fig. 2. The left position in each case is the position which the switches assume when the clutch coil 179 of this timer is not energized, while the two switch members are on the center position during the interval when the timer is timing, and when it times out both switch arms move to the extreme right positions. Therefore, when clutch coil 179 of this timer is energized, the arm of switch 177 moves to the center position and motor 175 continues to operate in order to put the timer through a timing cycle, while the movement of switch arm 178 to its center position upon the actuation of clutch 179 energizes intermediate conductor 173 directly from conductor 167 so that conductor 173 will remain energized even though momentary contact push button switch 169 is allowed to open again.

The energizing of conductor 173 by the closing of push button switch 169 also energizes solenoid 170, as mentioned, which closes simultaneously three switches 180, 181 and 182. These three switches connect the three incoming conductors 156–158 to a three-phase line to an ultra high frequency generator 183. The ultra high frequency generator 183 is supplied with current through three voltage dropping resistors 184, 185 and 186 which are connected respectively in circiut with switches 180, 181 and 182.

The energizing of conductor 173 also energizes the coil of clutch 187 of the timer 115, thus moving each of the switches 190 and 191 of this timer from the left-hand reset position to the center timing position. The motor 188 of this timer is also running, being energized through a conductor 189 which connects the motor between conductors 167 and 168 through the left-hand switch 190 of the timer. When timer 115 times out, which may, for example, require one second in a typical apparatus, the switch 190 moves to its extreme right position which stops the motor 188 of this timer. The other switch 191 moves simultaneously to its extreme right position, which closes the contacts of switch 191 and energizes a solenoid 192 through a conductor 193. The energization of solenoid 192 closes three switches 194, 195 and 196 which short circuit respectively resistors 184, 185 and 186 and apply full voltage to the incoming terminals of the ultra high frequency generator 183.

The ultra high frequency generator 183 which may, for example, be of the magnetron type then supplies ultra high frequency electromagnetic energy to the resonant cavity preheater through concentric conductor transmission line 51, 52. For protective purposes to prevent damage to the oscillator 183 there may be provided a loop 193 or other pickup device in the concentric conductor transmission line to provide a current proportional to the power reflected back to the oscillator from the resonant cavity heating chamber. The loop 193 may be connected to a contact making microammeter 194' which closes its contacts at a predetermined current and energizes electronic relay 161 through a conductor 197. The energizing of relay 161 opens contacts 196, thus deenergizing the entire control system and stopping operation of the oscillator if the reflected power in line 51, 52 becomes too great. The switch 162 shown in Fig. 2 is operated by a solenoid 197' which may, for example, be connected to be energized when the filament current of the electronic oscillator exceeds a predetermined value, thus opening switch 162 and deenergizing the entire control system. Other protective devices (not shown) may also be provided for the oscillator and for the remainder of the control circuits, such as door interlocks, for example, to prevent the energization of the control system while a door of the enclosure in which it is housed remains open.

When timer 114 times out and moves switches 177 and 178 to the extreme right positions, switch 177 opens the circuit to the motor 175 of this timer, while movement of switch 178 to the right-hand position deenergizes conductor 173 and as a result deenergizes clutches 179 and 187 and solenoids 170 and 171. Solenoid 192 is also deenergized because the deenergizing of clutch 187 causes timer 115 to reset, moving switch 191 to the left-hand reset position. The interval of timer 114 is set so that the pellet 8 in the preheater is at the proper temperature for molding at the end of this interval. The manual heating operation just described is to enable the operation of the preheater to be checked to make certain that the pellet is being heated properly and also for adjustment purposes in the event that the size or composition of the pellet is changed.

The fourth operation which may be performed manually is to close the press 298 for checking and adjustment purposes. To accomplish this, a switch 198 is first closed. This energizes a conductor 199 and through a second conductor 200 and a normally closed switch 201 energizes a solenoid 202 which opens by-pass valve 80. The energizing of conductor 199 also energizes a solenoid 203 through a circuit which includes a conductor 204, the normally closed contacts of a switch 205 and a conductor 206. The energizing of solenoid 203 opens the valve 81 to drain. Thus, the water drains readily from beneath piston 1a through conduit 79, valves 80 and 81 and out through drain conduit 82. The flow of water through this path provides for rapid movement of piston 1a and the remainder of clamping ram 1 until limit switch 75 is actuated by cam projection 78. The closing of switch 75 energizes a solenoid 207, closing a switch 208 and energizing a second solenoid 209. The energizing of the latter opens switch 201, deenergizing solenoid 202 and restoring by-pass valve 80 to its normally closed position. This forces the outlet water from beneath piston 1a to pass through orifice 83 and thereby slow down and cushion the motion of the clamping ram.

The clamping ram may be closed to the maximum extent possible on compressed air alone by closing a switch 210 which energizes a solenoid 211 through a conductor 212. Solenoid 211 is connected to and operates air valve 66 and the energizing of this circuit opens the air valve to admit air to upper chamber 55. This forces the water from the prefill chamber 55 through the port 56 and moves ram 1 until the two mold sections are in light pressure engagement. This is desirable for checking and adjusting the press, as previously stated.

For automatic operation, assume that push button 160 has been operated to energize solenoid 163 and close switches 164 and 165 so that the main supply conductors 167 and 168 are energized. The common operating mechanism of switches 117–120 inclusive is then operated so that each of these switches is moved to the position opposite that illustrated in Fig. 2. That is, switch 117 is opened, switch 118 is closed, switch 119 is opened, and switch 120 is closed. It is also necessary that switch 94 remain or be closed until the clamping ram is closed for the first time. The reason for the latter is explained in detail subsequently.

When push button 160 is depressed and conductors 167 and 168 are energized, the motor 175 of timer 114 is energized through conductor 176 and switch 177, the latter being at this time in the left-hand reset position in which position the circuit through the switch is closed. The motor 188 of timer 115 is also started at the same time, being energized through conductor 189 and switch 190 which is also closed in the left-hand reset position.

The next two operations are the closing of the clamping ram and the operation of the pusher which occur simultaneously. These two are independent, however, and can be described independently. The first to be considered is the pusher.

When switch 118 is closed, current flows through a conductor 213 to several devices which are connected thereto. Two of these are solenoids 138 and 139 which are energized through the normally closed contacts of push button switch 131 and normally closed switches 135 and 136 in parallel, and thence through conductor 137 in the similar manner to that described previously for manual operation. A solenoid 214 which operates valve 40 is also energized through a circuit which may be traced from conductor 213 in Fig. 2 through a conductor 215, a conductor 216, switch 174, a conductor 217 and thence (referring to Fig. 3) through a conductor 218 and the normally closed contacts of a switch 219, through the normally closed contacts of limit switch 19, and through the coil of solenoid 214 to the other supply conductor 168. Energizing solenoid 214 opens valve 40. Valve 39 is also opened, its operating solenoid 130 being energized through a circuit which can be traced from conductor 216 through switch 120 which is now closed and through conductors 127 and 125 and switch 155 to the coil of solenoid 130.

The actuation of valve 28 by energizing solenoid 138 admits air to the rod end of loader cylinder 27 and causes the loader to move forward to engage the heated pellet in the preheating chamber, while the opening of oil valves 39 and 40 allows oil to flow between the ends of the hydraulic check cylinder as the loader moves forward. Simultaneously with the operation of air valve 28 by solenoid 138, the valve 44 is moved by solenoid 139 to a position which admits oil to reservoir 46. This is for the excess oil to make up for the displacement of rod 33 in cylinder 34, which comes through valves 39 and 40 and thence through conduit 43 to valve 44. Inasmuch as both valves 39 and 40 are open at this time, rapid movement of the pusher 9 results.

Just prior to the touching of the preform in the resonant cavity heating chamber by the pusher 9, the cam surface 17 on the pusher operates limit switch 19 to open the circuit to solenoid 214 thus closing valve 40. This restricts the amount of oil which may pass from one end of the hydraulic check cylinder to the other end and reduces the speed of the pusher. This is necessary so as not to strike the pellet too hard a blow and thus lose control of it. Since the valve 39 is still open, the pusher continues to travel forward at reduced speed until it has engaged the pellet. When this occurs, the limit switch 19 drops off the cam 17 and again closes the circuit which energizes solenoid 214 and opens valve 40 so that the pusher again travels at full speed until it pushes the pellet onto the transfer ram.

At the forward end of the travel of pusher 9, limit switch 36 is operated by cam projection 38 on rod 33. As is shown in Fig. 3, the closing of limit switch 36 completes a circuit from conductor 213 through a conductor 220 to the coil of a solenoid 221 and a coil of a delayed operation solenoid 222. The energizing of conductor 220 also makes provision for the energizing of a solenoid 223 which operates hydraulic valve 90 through a pair of conductors 224 and 225 when a normally open switch 226 is subsequently closed. Energizing the solenoid 221 causes it to close a normally open switch 227 and open switch 136. The closing of switch 227 provides a circuit through timer 113 by means of which solenoid 221 holds itself in. The circuit may be traced from conductor 213 through conductor 215, then through the center switch 228 of timer 113 which is closed in the left-hand reset position, through a conductor 229 to the switch 227. This circuit remains closed until timer 113 (C2) subsequently times out and moves the operating member of switch 228 to the extreme right-hand open circuit position. It will be noted that switch 228 maintains contact in the center timing interval position.

Solenoid 222 provides a predetermined time delay after which it opens switch 135. At this point, since switch 136 is already open due to the energization of solenoid 221, the circuit to solenoids 138 and 139 is broken and they are deenergized to reverse pusher 9. Solenoid 222 is timed, however, so that this does not take place until shortly after the transfer ram 7 has moved past the pusher 9 as a result of the energization of a solenoid 330 which closes switch 226 and thereby energizes solenoid 223 to close hydraulic valve 90, as will be explained later. It should be pointed out here that pusher 9 does not actually enter opening 6 in which the transfer ram 7 operates. The momentum of the pellet is sufficient to carry it from opening 11 in which pusher 9 stops just short of entering opening 6 into the latter opening where it is picked up by the transfer ram.

Deenergizing solenoid 138 reverses the position of valve 28 and causes the pusher to reverse and travel all the way back to a point behind the stack of pellets where it picks up another pellet. Deenergizing solenoid 139 moves the valve 44 to the position which allows the volume of oil displaced by the piston rod to be drawn from reservoir 46 into the blind end of cylinder 34 as pistons 25 and 32 move from the blind ends to the rod ends of their cylinders. This reverse motion of the pusher operates limit switches 18 and 19, but since switches 147 and 151 operated by solenoid 140, and switches 124 and 144 operated by solenoid 122 are open, and switches 149 operated by solenoid 153 and 219 operated by solenoid 230 are in the deenergized positions, the operation of pusher 9 in the reverse direction is not affected by the operation of switches 18 and 19.

When the pusher withdraws completely and moves to its extreme left position, it operates limit switch 60. This energizes solenoid 230 which holds itself in through the switch 231. The energization of solenoid 230 opens the normally closed contacts of switch 219 and deenergizes solenoid 214 thereby closing valve 40. Energizing solenoid 230 also closes a switch 232 which, by energizing solenoids 138 and 139 through a conductor 297 and conductor 137, causes the pusher to reverse and move forward again to position another pellet in the resonant cavity preheater. Switches 135 and 136 both remain open until timer 113 times out. Therefore, switch 232 in shunt therewith through switch 133 is utilized for the operation of loading a pellet into the preheater. After positioning this pellet in the preheater the pusher retracts again to the neutral position previously mentioned, the motion and relay sequence for this chamber loading and retracting operation being exactly the same as that previously described for manual operation II except that at the end of the operation solenoid 154 does not become energized to open switch 123 and deenergize solenoid 122 because with switch 117 open for automatic operation the solenoid 122 will not become energized and, therefore, there is no need for solenoid 154 to operate.

While switch 232 initiates the loading of a pellet into the preheater, this switch is opened when timer 112 (C1) times out. Therefore, it is necessary to utilize switches 135 and 136 to initiate the subsequent transfer of the pellet from the preheater to the press. The use of switch 136, which is operated by solenoid 221, in parallel with switch 135 is to eliminate the inherent reset time of time delay solenoid 222 which operates the latter. This is necessary because it is important that the loader function as quickly as possible once the preheater timer reaches its timed out position. Switch 232 is opened when solenoid 230 is deenergized by the deenergization of conductor 217 which results from the opening of switch 174 (Fig. 2) by solenoid 171 when timer 112 times out.

As mentioned previously, the operation of the clamping ram occurs simultaneously with that of the pusher. At the start of a cycle when the pusher is moving a pellet from the stack into the preheater, the clamping ram moves downward. With switch 198 closed for automatic operation, solenoid 203 which operates valve 81 is energized through a circuit which includes conductors 199 and 204, the normally closed contacts of a switch 205, and a conductor 206. Valve 81, it will be recalled, is a three-way valve which, when energized, shuts off the high pressure water supply to the bottom of cylinder 57 and opens it to drain, thus making provision for piston 1a to descend.

As previously stated in connection with manual operation III, it is necessary for manual operation to close switch 210 to energize solenoid 211 and actuate valve 66 in order to introduce air pressure on top of the water in chamber 55 and force the ram down. For automatic operation a solenoid 233 is energized and holds itself in through normally open switch 234 and normally closed contacts of limit switch 70. Solenoid 233 is energized initially by energizing a solenoid 235 by means of a circuit which may be traced from conductor 199 through a conductor 236, a switch 237 which is closed at this time, a conductor 238, limit switch 74 which is operated by cam surface 77 as the ram descends, the normally open contacts of switch 205 which are now closed and a conductor 239 to the coil of solenoid 235. Energizing solenoid 235 closes a switch 240 which in turn energizes solenoid 233 directly from conductor 238.

Holding the solenoid 233 energized in this manner holds closed a normally open switch 297 which energizes solenoid 211 through conductors 296 and 212 to open air valve 66. It will be understood that as soon as the clamping ram reaches its topmost position following a retraction, the limit switch 74 is operated, initiating the chain of events just described for automatic clamping ram operation which results in the clamping ram immediately reversing and starting down again. Therefore, switch 210 is no longer needed to energize operating solenoid 211 for valve 66 and this switch may be open for automatic operation.

When automatic operation starts, the normally closed valve 80 connected in shunt with orifice 83 is opened to allow fast travel by the clamping ram. This occurs in the same manner previously described under manual operation III, with the operating solenoid 202 for this valve being energized from conductor 199 through conductor 200 and switch 201 which is closed at the proper times during retraction and closing of the clamping ram.

Switch 75 is operated by the clamping ram just before the mold surfaces meet to close the switch contacts. This energizes the coil of a solenoid 207 and closes a switch 208 to energize a solenoid 209. Energizing solenoid 209 opens switch 201 to deenergize operating solenoid 202 for valve 80 and return the valve to the closed position, thus forcing the water through orifice 83 and allowing the clamping ram to travel at slow speed the last fraction of an inch before closing the mold. This may, for example, be approximately ⅛".

When the mold surfaces make contact, limit switch 70 is actuated to open its normally closed contacts, thus deenergizing conductor 241, and close its normally open contacts to enrgize a conductor 242. Energizing the latter conductor energizes a solenoid 243 and an additional conductor 244 which in turn energizes the clutch 245 of timer 112 (C1), a solenoid 246 which operates valve 64, and a solenoid 247 which operates valve 71. The latter solenoid is energized through the right-hand switch 351 of timer 113 which is closed in the reset and timing positions. Timer 113 is now in the reset position, but later is energized by timer 112 and caused to go through its timing cycle. As mentioned previously, the air pressure used in moving the clamping ram down to actuate switch 70 does not develop sufficient force to damage the mold in the event that some of the parts or flash from the previous load were not blown clear of the mold. If this happens or if a part sticks in a mold cavity, the press stalls because the switch 70 is not operated until the last few thousandths of an inch of movement of the clamping ram.

If the mold sections are clean, thus enabling mold section 2 carried by the clamping ram to make contact with the stationary mold section 3, the switch 70 is actuated and actuates the devices mentioned above. The deenergizing of conductor 241 by the opening of switch 70 deenergizes solenoid 233 which in turn opens switch 297 and deenergizes solenoid 211. The latter operation closes valve 66 and cuts off the flow of air to chamber 55. The energizing of conductor 242 by the actuation of switch 70 and the consequent energizing of solenoid 246 opens the drain valve 64 and relieves the air pressure in the chamber 55 and forces any water which may be above check valve 61b in chamber 61 to escape to atmospheric pressure. The simultaneous energization of solenoid 247 actuates valve 71 to admit air below piston 72 and close valves 58, 59 between chambers 55 and 57. Energizing the clutch 245 of timer 112 starts this timer in operation inasmuch as the motor 248 of this timer is already running, having been energized from conductor 199 through intermediate conductor 249 and thence through the right-hand switch 250 of this timer which is closed in its left-hand reset position.

Energizing solenoid 243 closes a switch 251 which is connected in parallel with a switch 252 operated by the solenoid 330. The closing of switch 251 permits solenoid 330 to be energized and hold itself in through switch 252 inasmuch as a switch 253 has previously been closed by solenoid 207. The energizing circuit for solenoid 330 may be traced from switch 251 through a conductor 254 and through switch 253 to a conductor 255 and thence through the coil of solenoid 330. Energizing solenoid 330 also closes switch 226 which energizes solenoid 223 through a circuit which has previously been traced from conductor 213 through conductor 215, switch 228, conductor 229, switch 227 which is now closed, and thence through conductor 225, switch 226 and conductor 224 to the coil of solenoid 223. Energizing solenoid 223 actuates the valve 90 which operates the transfer ram. The reason for closing valve 90 at this time is to cause the transfer ram to travel up and transfer the material to the plurality of cavities 4, 5 and then follow the clamping ram for a short distance as the mold sections subsequently part to dislodge the slug in the transfer pot. The transfer ram follows the clamping ram only until switch 70 is actuated again as the uppermost mold section 2 moves away from the stationary mold section 3. This arrangement also prevents movement of the transfer ram until the mold is completely closed with water pressure in chamber 57 to eliminate the possibility of the transfer ram forcing the clamping ram open while it is still on air pressure, as will be understood from the subsequent description. The transfer ram may, for example, have a rating of 20 tons as compared to a 50-ton rating for the clamping ram but the 20-ton pressure could, of course, overcome the force of the clamping ram resulting from air pressure only. The manner in which this action takes place will be understood with the explanation of the action of air valve 71.

The circuit to solenoid 223 which operates valve 90 is closed by limit switch 36 operated by the pusher when this limit switch closes to energize solenoid 221 (which holds itself in through its normally open switch contacts 227) in a manner previously explained. Having the operating solenoid 223 for valve 90 thus dependent upon the closing of limit switch 36 prevents movement of transfer ram 7 until the pellet is in position over it. The action of the transfer ram in following the clamping ram as the latter opens is accomplished by the use of a switch 256 which is closed when the solenoid 243 is energized. The closing of switch 256 energizes a conductor 257 which is connected to the switch 227 and keeps the circuit to solenoid 223 (for valve 90) closed until solenoid 243 is deenergized by the opening of limit switch 70 when the mold opens even though the circuit to solenoid 223 through timer 113 has already been broken when this timer timed out and moved switch 228 to its extreme right position.

Air valve 71 is also moved to admit air to the underside of piston 72 in cylinder 109 when switch 70 is actuated at the time the mold closes, and this air valve remains in this condition until timer 113 times out following the conclusion of the timing interval of timer 112. As mentioned previously, solenoid 247 which operates valve 71 is energized through switch 351 of timer 113 which is closed in the reset and timing positions of this timer. Also as mentioned previously, this operation of valve 71 moves piston 72 to close a port 56 through which water has passed to produce the downward travel of the clamping ram. Simultaneously with the closing of this port, switch 94 is actuated by the end of the operating rod 73.

The closing of limit switch 94 energizes, through a conductor 258 and the normally closed contacts of a switch 259, a solenoid 260 which actuates valve 84. This action admits water at 2000 lbs. pressure into the top of cylinder 57 and exerts 50 tons of clamping pressure on the upper mold section until the completion of the interval set on timer 113. The energizing of the conductor 258 by the closing of switch 94 also energizes a solenoid 262, thus closing a switch 263 and providing another source of energization for solenoid 203 which operates valve 81. This is necessary since solenoid 264 which operates switch 205, through which solenoid 203 is initially energized, is energized by timer 116 (BO5) to open switch 205 as soon as timer 113 times out, but solenoid 203 must be kept energized to maintain valve 81 in the drain position until port 56 is again opened.

When switch 70 is operated at the bottom of the clamping ram stroke, solenoid 246 is also energized as mentioned previously, opening valve 64. This opens the bottom of the chamber 61 to drain and due to the trapped air pressure, expels through check valve 61b any water which may have accumulated in prefill chamber 55 during the previous cycle. All movements are now complete until timer 112 (C1), the clutch 245 of which is also energized by the actuation of switch 70, times out. As explained previously, the motor 248 of this timer was started by the switch 250 which keeps the motor running until the end of the timing interval. When the timer 112 times out it stops its motor by opening switch 250, while it simultaneously closes switch 264. The latter energizes conductor 173 through a circuit which may be traced from supply conductor 167 through a conductor 265, switch 264, and through a second conductor 266 to conductor 173. The energizing of conductor 173 energizes the clutches of timers 114 and 115 and initiates the heating operation in the same manner as was previously described for manual operation by depressing push button switch 169.

In addition to energizing the clutches of the preheat timers and the other devices associated with the heating cycle the closing of switch 264 by timing out of timer 112 also energizes the clutch 267 of timer 113 (C2). The motor 268 of this timer is already running at this time, having been energized through conductor 215 and switch 228 which was closed when this timer was reset from its previous operation. When timer 113 times out it closes switch 269 in addition to opening switch 228 to stop the motor and opening switch 351. The closing of switch 269 energizes the clutch 270 of timer 116 (BO5) through a circuit which may be traced from conductor 199 through conductor 271, thence through switch 269 and a conductor 272 to the clutch 270, with the circuit being completed through a conductor 273 to the supply conductor 168. The motor 274 of timer 116 was started by closing switch 198, and after being stopped momentarily due to the opening of switch 275 when the timer 116 times out at the end of each timing interval, the motor again resumes operation when switch 275 operated by the timer returns to its reset position. Thus the motor 274 of timer 116 is running when clutch 270 is energized. Energizing the clutch 270 of timer 116 moves this timer from the reset to the timing position, thus closing a pair of switches 276 and 277. The first of these holds the clutch 270 in until the completion of the timing interval. The second switch 277 energizes a conductor 278 which energizes a solenoid 264 and a solenoid 279, the latter of which opens air valve 103 to admit air to header 12. This air may, for example, be at a pressure of 90 pounds per square inch gage and it produces an air blast through ports 106 which blows the molded parts and flash out of the machine as the mold sections part. Energizing solenoid 264 opens the normally closed contacts of switch 259, thus deenergizing solenoid 260 and closing high pressure water valve 84. The closing of the normally open contacts of switch 259 then energizes a solenoid 261 through a conductor 280 and a conductor 281. Energizing solenoid 261 opens valve 85 and releases the water pressure on the top of cylinder 57.

At the same time that timer 113 energizes the clutch of timer 116, it also deenergizes solenoid 247 which operates valve 71, through the movement of switch 351 to its right-hand timed out position. The deenergizing of solenoid 247 reverses valve 71 and supplies air to the top of piston 72 in cylinder 109 to open port 56. As mentioned previously, the solenoid 203 which operates valve 81 is kept energized by the action of solenoid 262 and switch 263 until the limit switch 94 is operated by the movement of rod 73 downward which now takes place. The opening of limit switch 94 also breaks feed to solenoid 261 which allows valve 85 to close and prevents loss of water from chamber 57 with the upward stroke of ram 1 which follows. When piston rod 73 moves the valve member 58, it disengages seat 59 to open port 56, and simultaneously solenoid 203 is deenergized to allow valve 81 to open. The opening of this valve admits water under high pressure to the bottom of the cylinder 57 to retract the clamping ram 1 and open the press. With all valves to chambers 55 and 57 closed, this upward stroke compresses air above the water which starts the ram down again as soon as valve 81 is energized again to shift from high pressure to atmospheric pressure. Air from line 62 does not enter chamber 55 until this air compressed above the water expands to below the pressure in line 62 so that check valve 67 can operate. With proper adjustment of the timers, the mold opens at the end of the interval of the second cure timer, is blown out and then closed again while the preheating operation is still going on.

The pusher 9 then picks up the next heated pellet and moves it on to the transfer ram and thereafter the automatic transferring, molding, curing and ejecting cycle just described is repeated continuously as long as automatic operation is desired. In order to stop the operation of the molding machine, push button switch 166 is depressed, opening its normally closed contacts and closing the normally open contacts. The opening of the normally closed contacts deenergizes the solenoid 163 and opens switches 164 and 165, thereby deenergizing the main supply conductors 167 and 168 and completely deenergizing the electrical control circuits and the control circuits to the ultra high frequency generator.

The closing of the normally open contacts of switch 166 energizes solenoid 300 which closes switches 301 and 302. The purpose of switches 301 and 302 is to open the press after operation has been stopped by depressing push button switch 166 or by one of the protective devices such as relay 161 or switch 162. Even though the control circuits of the machine are deenergized, it would not otherwise be possible to open the press because air pressure on the top of piston 72 could not move valve 58 away from its seat. This is due to the higher static pressure in chamber 57 above piston 1a and 2000 lbs. pressure being exerted below piston 1a attempting to move it upward. When switches 301 and 302 are closed, solenoid 261 is energized through a circuit which may be traced from switch 302 through conductor 281 to the coil of the solenoid and back through return conductor 168 to switch 301. Thus, drain valve 85 is opened without operating any other portion of the control system. The opening of this valve releases the pressure in chamber 57 above the piston and allows valve member 58 to move and open port 56.

This completes the description of the automatic operation of the applicants' molding machine with the exception of the operation of the cushioning valve 80 which was described in part under the description of manual operation IV. During automatic operation, this valve provides a cushioning action in a similar manner to that described under manual operation. During the down stroke of the clamping ram current flows through the normally closed contacts of switch 205 to energize solenoid 207 as soon as limit switch 75 is closed just prior to closing of the mold. Energizing solenoid 207 closes switch 208 and completes the circuit to energize solenoid 209. This opens the contacts of switch 201 to deenergize solenoid 202 which closes valve 80 and forces the water to flow through orifice 83 in order to slow down the ram travel.

The upstroke of the clamping ram is started by the closing of switch 277 of the blowout timer 116 which energizes solenoid 264 and moves switch 205 from the lower position illustrated in Fig. 3 to the upper position thereby closing the normally open contacts of this switch. The energizing of solenoid 264 also closes switch 237. With switch 237 and the upper contacts of switch 205 closed a circuit is completed to solenoid 235 when switch 74 is closed just prior to completion of the upward stroke of the clamping ram. Energizing solenoid 235 closes a switch 280 to energize solenoid 209. This opens switch 201, deenergizing solenoid 202 and closing valve 80 in the same manner as during the downward stroke. As described previously, energizing solenoid 235 also closes switch 240 which completes a circuit to solenoid 233 which holds itself in through switch 234 until the mold closes again and opens the normally closed contacts of switch 70. Also as previously described, the energizing of solenoid 233 closes switch 297 which energizes solenoid 211 to open valve 66 and apply air pressure on top of the water in the prefill chamber 55 to push the clamping ram down by means of air pressure until switch 70 is operated.

From the foregoing it will be apparent that the applicants provide a molding machine for thermosetting and other plastic materials which takes a preformed pellet of the material to be molded from a stack as it is needed and feeds it into a resonant cavity heating chamber to be preheated. The heating of a pellet takes place simultaneously with the curing of the previous parts in the mold. When the previous parts have been cured and ejected from the mold by means of ejector pins and compressed air, the heated preform is pushed into the transfer pot. Here the heated material is subjected to high pressure by the transfer ram and forced through small channels into the mold cavities to form a plurality of molded parts which are in turn cured and then ejected.

While there is described herein a molding machine utilizing transfer molding, it will be readily understood that this invention is adaptable also to compression molding. In order to use compression molding, it is necessary only to raise the pusher mechanism and preheater sufficiently that the pusher pushes the heated pellet onto the upper surface of lower mold section 3 instead of through opening 11 in the side of this mold section. The transfer ram is also eliminated, of course, and a conventional compression mold section substituted for the transfer mold section 3 which is illustrated in Fig. 1. Then after a heated pellet is transferred to the fixed mold section, the clamping ram and upper movable mold section are utilized in the conventional manner to apply pressure and mold a part between mold sections 2 and 3.

Thus, while we have illustrated and described a preferred embodiment of our invention, modifications thereof may be made. It should be understood, therefore, that we intend to cover by the appended claims any such modifications which fall within the true spirit and scope of our invention.

What we claim as new and desire to secure by Letters Patent of the United States is:

1. A molding machine comprising a resonant cavity heating chamber having walls made of an electrically conducting material, a generator coupled to said heating chamber for producing standing electromagnetic waves in said chamber, pusher means for inserting a charge in said chamber and immediately withdrawing, said charge comprising a single preformed pellet of a material to be molded, means for causing said generator to deliver energy to said heating chamber whereby said charge is heated, a vertically partable heated mold comprising an upper movable section and a lower fixed section having a transfer ram opening therethrough, said two sections having a plurality of cooperating depressions in each forming a plurality of mold cavities in the mold closed position, a plurality of channels connecting said cavities to said transfer ram opening to provide for the passage of material being molded from ram opening into said cavities, an operating mechanism for the movable mold section comprising a ram, a first chamber, a piston in said chamber for operating said ram, a second chamber connected to said first chamber by means of a port, valve means for closing and opening said port, means for admitting gas under pressure to said second chamber whereby hydraulic fluid therein is forced into said first chamber and said piston and said ram are moved through a substantially complete closing stroke, means for actuating said valve to close said port, means for applying a predetermined hydraulic pressure to said piston, a side opening in said fixed mold section communicating with said transfer ram opening, said pusher means transferring the heated pellet from said heating chamber on to the ram through said side opening and again immediately withdrawing, and hydraulic means for operating said transfer ram to apply pressure to said pellet in cooperation with said clamping ram thereby forcing the heated pellet into said plurality of the molding cavities through said interconnecting channels, said transfer ram exerting a smaller pressure than said clamping ram, timing means permitting the molded parts to cure in said mold for a predetermined interval, and means for removing the molded parts from the mold and from the machine, said last named means including electrical timing means for operating said valve means to open said port thereby to allow said clamping ram to retract and for actuating said hydraulic means to retract said transfer ram, the said electrical timing means being arranged so that the said transfer ram follows the said clamping ram for a short distance before retracting whereby to loosen the flash and molded parts from the said fixed mold section.

2. An automatic transfer molding machine comprising a retainer for holding a plurality of preformed pellets of a material to be molded in a substantially vertical stacked relationship, an ultra high frequency preheater, pusher means including an electrically controlled pneumatically operated mechanism for engaging the lower one of said pellets and moving it into said preheater in response to a predetermined signal, a press having the heated mold comprising a movable mold section and a fixed mold section provided with an opening for a transfer ram, said two mold sections having a plurality of cooperating depressions therein forming a plurality of mold cavities, a plurality of channels connecting said cavities to said transfer ram opening for the passage of material to be molded from said transfer ram opening into said cavities, a clamping ram carrying said movable mold section, an operating mechanism for said clamping ram comprising a first chamber, a piston in the said chamber forming a portion of said clamping ram, a second chamber connected by a port to said first chamber, valve means arranged to close and open said port, means for admitting gas under pressure to said second chamber to force hydraulic fluid through said port into said first chamber and thereby operate said piston and said clamping ram to close said movable mold section, means for actuating said valve means to close said port, and means for applying hydraulic pressure to said first chamber to exert an increased pressure on said movable mold section, a transfer ram operating in said opening in said fixed mold section, hydraulic operating means for said transfer ram, said transfer ram cooperating with said clamping ram to force a heated charge through said channels into said mold cavities whereby a plurality of parts having the shapes of said mold cavities are formed, the molded parts being cured by the heat of the mold and the continuing pressure of said rams during a curing interval, a first timing means determining said interval, means responsive to said first timing means for actuating said pusher during the first portion of said curing interval to transfer a pellet from said vertical stack to said preheater, second timing means effective at the end of said first portion to actuate said ultra high frequency generator to cause it to supply energy to said preheater thereby heating the pellet, said second timing means providing an interval for such heating extending beyond the termination of said curing interval, a third timing means operative at the termination of said curing interval for an additional interval concluding before the end of said heating interval, said third timing means actuating said clamping ram operating mechanism to open and close said clamping ram during said third interval, said third timing means also actuating said transfer ram to retract it, said transfer ram following said clamping ram for a short distance before retracting to loosen the flash and molded parts from said fixed mold section, a plurality of pins operable responsively to the opening of said movable mold section for loosening the molded parts from said movable mold section, and compressed air means for blowing said flash and molded parts out of said machine, said third timing means also actuating said compressed air means during said third interval, whereby said press is ready to receive another pellet from said preheater at the conclusion of said heating interval thereby providing continuous automatic operation.

3. In an automatic molding machine having a preheating chamber, a press having a heated mold comprising a fixed mold section having an opening therein for a transfer ram and a movable mold section cooperating therewith, a clamping ram carrying said movable section, an operating mechanism for said clamping ram comprising a first chamber, a piston in said chamber for operating said clamping ram, a second chamber connected to said first chamber by a port, valve means for closing and opening said port, means for admitting gas under pressure to said second chamber to force hydraulic fluid from said second chamber through said port into said first chamber to move said piston and ram in the closed mold direction a substantially complete stroke, means including a limit switch responsive to the travel of said ram for closing said valve means, means for applying hydraulic pressure to said first chamber after the closing of said valve means, a transfer ram operable in said opening in said fixed mold section and cooperating with said clamping ram whereby to mold material previously heated in said preheating chamber, and an electrically controlled loading mechanism comprising a pusher arranged to insert a charge of material to be molded in said preheating chamber and withdraw in response to a predetermined signal and subsequently to move the heated charge from the preheating chamber to the press in response to a second predetermined signal and again withdraw, a first electrical timer providing a predetermined curing interval for the molded material in said press, electrical control means responsive to a predetermined signal from said timer for causing said loading mechanism to insert a charge in said preheating chamber during the first portion of said curing interval, a second electrical timer operative at the conclusion of said first portion of said curing interval to actuate said preheater, said second timing means maintaining said preheater in operation for a second interval extending beyond the termination of said curing interval, a third electrical timer operative at the conclusion of said curing interval and providing a third interval which terminates before the end of said second interval, electrical control means responsive to said third timer for retracting and closing said clamping ram, means for removing said molded material from said press, electrical control means responsive to said third timer for actuating said material removing means, whereby at the termination of said second interval said press is ready to receive and mold another charge, a second predetermined signal being provided at the termination of said second interval to cause said pusher to move a heated charge from said preheating chamber to said press, thereby providing continuous automatic operation.

4. An hydraulically operated press comprising a vertically disposed hydraulic chamber, a piston movable in said chamber, a second chamber disposed immediately above said hydraulic chamber and connected thereto by a port, said second chamber containing hydraulic fluid therein, valve means for opening and closing said port, means for admitting gas under pressure to said second chamber while said port is open to force hydraulic fluid therefrom into said hydraulic chamber to move the said piston through substantially a complete stroke, a vertically disposed baffle chamber within said second chamber for deflecting the entering gas upwardly and away from said port for preventing the foaming of said fluid as it passes from said second chamber into said hydraulic chamber, check valve means in the lower portion of the wall of said baffle chamber, and means for venting said baffle chamber to the atmosphere after the closing of said port whereby any hydraulic fluid in excess of the predetermined amount is removed from said second chamber through said check valve and baffle chamber, and connections for admitting fluid from a source of hydraulic fluid under pressure to said hydraulic chamber after the closing of said port whereby to complete the stroke of said piston.

5. An hydraulically operated press comprising a first chamber, a piston movable in said first chamber, a second chamber containing hydraulic fluid therein and connected to said first chamber by a port, a first valve means for opening and closing said port, a source of gas under pressure, means for admitting gas under pressure from said source to said second chamber while said port is open to force hydraulic fluid from said second chamber into said first chamber to move said piston through a substantially complete stroke, a first actuating means movable with said piston for actuating said valve means to close said port when said piston has moved through a substantially complete stroke, fluid discharge means actuatable by said first actuating means for removing from said second chamber after the closing of said port fluid in excess of a predetermined amount, a source of hydraulic fluid under pressure, a second valve means controlling the admission of hydraulic fluid under pressure from said fluid source to said first chamber, second actuating means operated with said first valve means for actuating said second valve means upon the closing of said port to admit hydraulic fluid under pressure to said first chamber from said fluid source to complete the stroke of said piston, and means for operating said piston automatically through a return stroke including timed means for operating said first valve means to open said port and thereby to admit hydraulic fluid from said first chamber into said second chamber to prepare the operating mechanism for another operation.

References Cited in the file of this patent

UNITED STATES PATENTS

| | | |
|---|---|---|
| 1,809,615 | Wilson | June 9, 1931 |
| 1,993,942 | Novotny | Mar. 12, 1935 |
| 2,324,149 | Gray | July 13, 1943 |
| 2,380,084 | Strauss | July 10, 1945 |
| 2,371,450 | Langdon | Mar. 13, 1945 |
| 2,403,912 | Doll | July 16, 1946 |
| 2,467,440 | Meharg et al. | Apr. 19, 1949 |
| 2,480,313 | Alden | Aug. 30, 1949 |
| 2,489,412 | Harvey | Nov. 29, 1949 |
| 2,522,134 | Sayre | Sept. 12, 1950 |
| 2,537,182 | Bertrand | Jan. 9, 1951 |